(12) United States Patent
Tujkovic et al.

(10) Patent No.: US 9,532,237 B2
(45) Date of Patent: Dec. 27, 2016

(54) REDUCING COMPLEXITY AND POWER CONSUMPTION IN CELLULAR NETWORKS WITH CARRIER AGGREGATION

(71) Applicant: Broadcom Corporation, Irvine, CA (US)

(72) Inventors: Djordje Tujkovic, Mountain View, CA (US); Louay Jalloul, San Jose, CA (US); Robert Lorenz, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 598 days.

(21) Appl. No.: 13/837,862

(22) Filed: Mar. 15, 2013

(65) Prior Publication Data

US 2013/0242784 A1 Sep. 19, 2013

Related U.S. Application Data

(60) Provisional application No. 61/611,503, filed on Mar. 15, 2012.

(51) Int. Cl.
*H04W 24/02* (2009.01)
*H04L 5/00* (2006.01)

(52) U.S. Cl.
CPC .............. *H04W 24/02* (2013.01); *H04L 5/003* (2013.01); *H04L 5/001* (2013.01); *H04L 5/0091* (2013.01); *Y02B 60/50* (2013.01)

(58) Field of Classification Search
None
See application file for complete search history.

(56) References Cited

U.S. PATENT DOCUMENTS

2010/0273515 A1 * 10/2010 Fabien et al. ................. 455/509
2010/0322291 A1 * 12/2010 Kaikkonen .......... H04B 1/7117
375/147

(Continued)

FOREIGN PATENT DOCUMENTS

WO   WO/2011/072567   *   6/2011
WO   WO/2011/105261   *   9/2011

OTHER PUBLICATIONS

Motorola, "Text Proposal for LTE-A Spectrum Aggregation Scenarios and Their Impact on UE Architecture," 3GPP (3rd Generation Partnership Project) Draft, Mobile Competence Centre, France (Sep. 24, 2008).

(Continued)

*Primary Examiner* — Christine Duong
(74) *Attorney, Agent, or Firm* — Sterne, Kessler, Goldstein & Fox P.L.L.C.

(57) ABSTRACT

In a communications network with carrier aggregation (CA), embodiments enable the network to advertise to a supported wireless device not only whether or not aggregated component carriers allocated to the wireless are intra-band adjacent but further whether or not the allocated component carriers are collocated. Embodiments further enable the wireless to advertise its CA capabilities including the support of adjacent collocated CA and/or non-adjacent collocated CA. Embodiments thus provide systems/methods for the exploitation of special conditions provided by adjacent collocated component carriers to reduce processing complexity and power consumption for certain types of wireless device transmitter/receiver architectures and to support intra-band adjacent CA for other types of UE transmitter/receiver architectures.

22 Claims, 18 Drawing Sheets

(56) References Cited

U.S. PATENT DOCUMENTS

| | | | | |
|---|---|---|---|---|
| 2012/0087257 | A1* | 4/2012 | Larsson | H04L 5/001 |
| | | | | 370/252 |
| 2013/0177091 | A1* | 7/2013 | Lim et al. | 375/260 |
| 2014/0192663 | A1* | 7/2014 | Rosa et al. | 370/252 |
| 2015/0011233 | A1* | 1/2015 | Kazmi et al. | 455/454 |

OTHER PUBLICATIONS

Motorola, "Spectrum Aggregation Operations—UE Impact Considerations," 3GPP ($3^{rd}$ Generation Partnership Project), Mobile Competence Centre, France (Nov. 5, 2008).

ZTE Corporation, "Analysis and Discussion on Mobility Measurements in Carrier Aggregation (CA)," 3GPP ($3^{rd}$ Generation Partnership Project) Draft, Mobile Competenence Center, France (Jun. 22, 2010).

International Search Report and Written Opinion for International Application No. PCT/US2013/032306, European Patent Office, Netherlands, mailed on Jul. 4, 2013.

International Preliminary Report on Patentability directed toward related International Application No. PCT/US2013/032306 issued from The International Bureau of WIPO on Sep. 16, 2014; 8 pages.

\* cited by examiner

REDUCING COMPLEXITY AND POWER CONSUMPTION IN CELLULAR NETWORKS WITH CARRIER AGGREGATION

CROSS-REFERENCE TO RELATED APPLICATIONS

The present invention claims the benefit of U.S. Provisional Application No. 61/611,503, filed Mar. 15, 2012, which is incorporated herein by reference in its entirety.

BACKGROUND

Field of the Invention

The present disclosure relates generally to reducing complexity and power consumption in cellular networks with carrier aggregation.

Background Art

Carrier Aggregation (CA) is a feature of Release-10 of the $3^{rd}$ Generation Partnership Project (3GPP) LTE-Advanced standard, which allows multiple resource blocks from/to multiple respective serving cells to be logically grouped together (aggregated) and allocated to the same User Equipment (UE). The aggregated resource blocks are known as component carriers (CCs) in the LTE-Advanced standard. The UE may thus receive/transmit multiple CCs simultaneously from/to the multiple respective serving cells, thereby effectively increasing the downlink/uplink bandwidth of the UE.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

For purposes of this discussion, the term "module" shall be understood to include at least one of software, firmware, and hardware (such as one or more circuits, microchips, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

In the following disclosure, terms defined by the Long-Term Evolution (LTE) standard are used. For example, the term "eNodeB" is used to refer to what is commonly described as base station (BS) or base transceiver station (BTS) in other standards. The term "User Equipment (UE)" is used to refer to what is commonly described as a mobile station (MS) or mobile terminal in other standards. The term "component carriers (CCs)" is used to refer to resource blocks (defined in terms or frequency and/or time) that are aggregated (logically grouped) together. However, as will be apparent to a person of skill in the art based on the teachings herein, embodiments are not limited to the LTE standard and can be applied to other wired or wireless communication standards.

Figure 1:
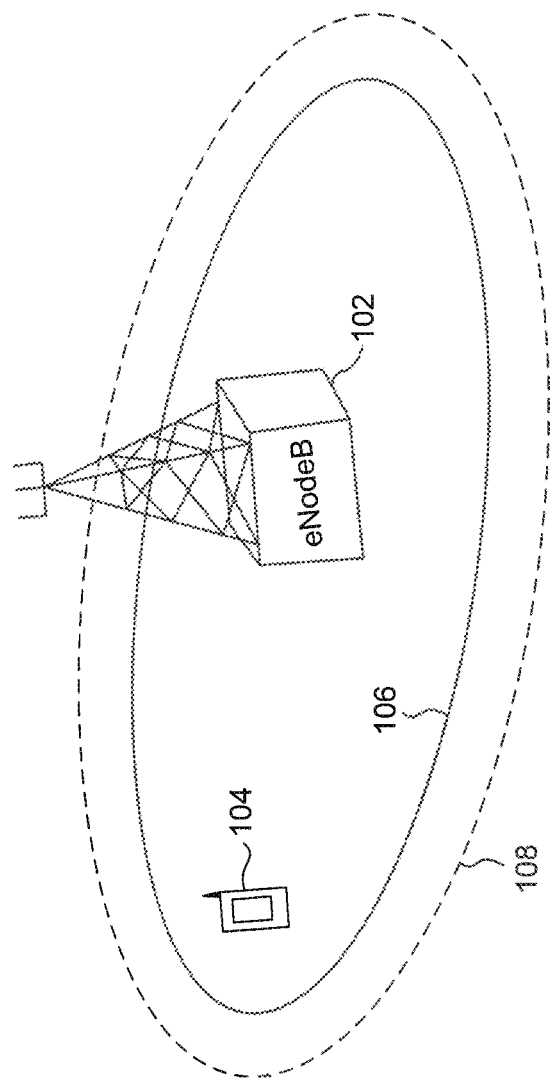
FIG. 1 illustrates an example cellular network environment.

FIG. 1 illustrates an example cellular network environment 100. Example cellular network environment 100 is provided for the purpose of illustration only and is not limiting of embodiments. As will be apparent to a person of skill in the art, embodiments are not limited to cellular networks or to wireless networks, and may be applied in other types of networks such as cable networks (e.g., DOCSIS) and optical networks (e.g., EPON, EPoC, GPON), for example.

As shown in FIG. 1, example network environment 100 includes an Evolved Node B (eNodeB) 102 and a UE 104. UE 104 may be any wireless device capable of cellular-based communication, including a cellular phone, tablet, laptop, etc. For the purpose of illustration, it is assumed that eNodeB 102 supports a plurality of serving cells, including a primary serving cell (Pcell) and a secondary serving cell (Scell). Example coverage areas of the Pcell and the Scell are illustrates by coverage areas 106 and 108 respectively in FIG. 1. Typically, the Pcell and the Scell use separate frequency resources. Depending on its receiver capabilities, UE 104 may communicate with one or the other, or both, of the Pcell and the Scell.

Carrier Aggregation (CA) is a feature of Release-10 of the $3^{rd}$ Generation Partnership Project (3GPP) LTE-Advanced standard, which allows multiple resource blocks (defined in terms of frequency and/or time) from/to multiple respective serving cells to be logically grouped together (aggregated) and allocated to the same UE. The aggregated resource blocks are known as component carriers (CCs) in the LTE-Advanced standard. The UE may thus receive/transmit multiple CCs (more specifically, receive/transmit data over the multiple CCs) simultaneously from/to the multiple respective serving cells, thereby effectively increasing the downlink/uplink bandwidth of the UE. The multiple respective serving cells may or may not be located at the same eNodeB of the cellular network.

Release-10 of the LTE-Advanced standard allows a maximum of five CCs to be allocated to a UE at any given time. CCs can vary in size from 1 to 20 MHz, resulting in a maximum bandwidth of 100 MHz that can be allocated to the UE in the downlink/uplink. The allocation of CCs to the UE is performed by the network and is communicated to the UE, typically by the Pcell associated with the UE.

Figure 2A:
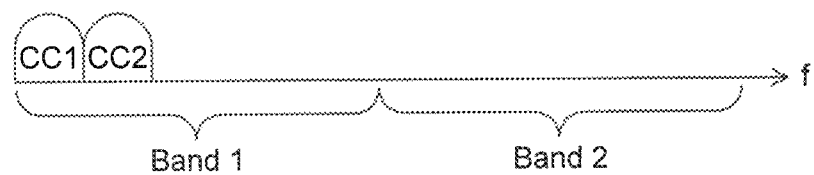
FIGS. 2A-2C illustrate various forms of carrier aggregation (CA) as defined by Release-10 of the $3^{rd}$ Generation Partnership Project (3GPP) Long-Term Evolution (LTE)-Advanced standard.
Figure 2B:
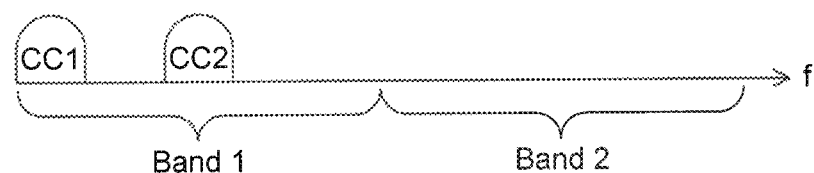
Figure 2C:
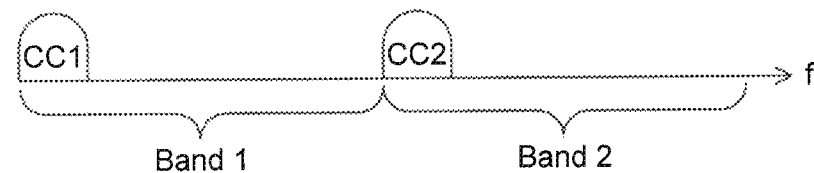

FIGS. 2A-2C illustrate various forms of CA as defined by Release-10 of the LTE-Advanced standard. Specifically, FIG. 2A illustrates intra-band adjacent CA, in which aggregated CCs are within the same frequency band and adjacent to each other forming a contiguous frequency block. FIG. 2B illustrates intra-band non-adjacent CA, in which aggregated CCs are within the same frequency band but are not adjacent to each other. FIG. 2C illustrates inter-band CA, in which aggregated CCs are in different frequency bands.

Figure 3:
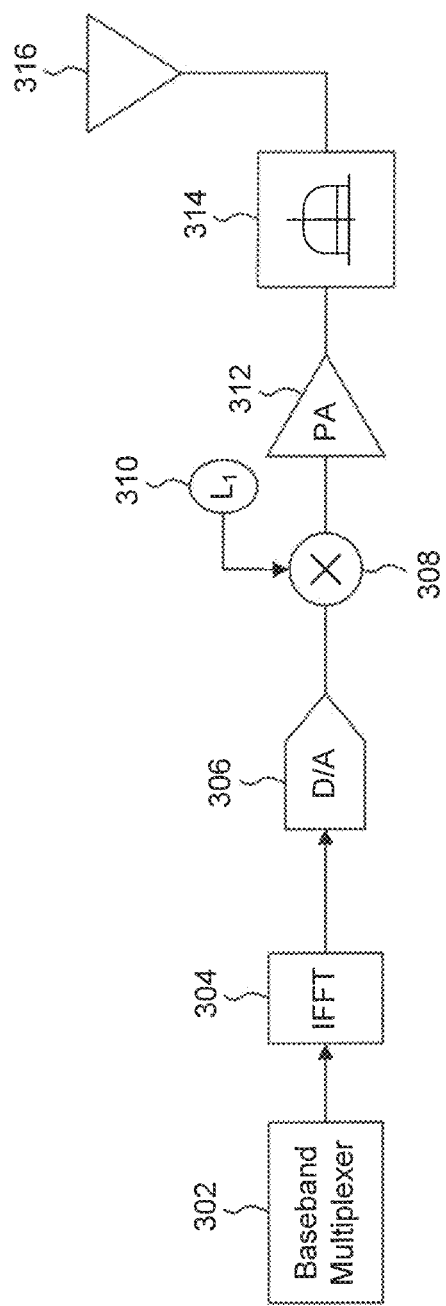
FIGS. 3-5 illustrate example transmitter architectures.
Figure 4:
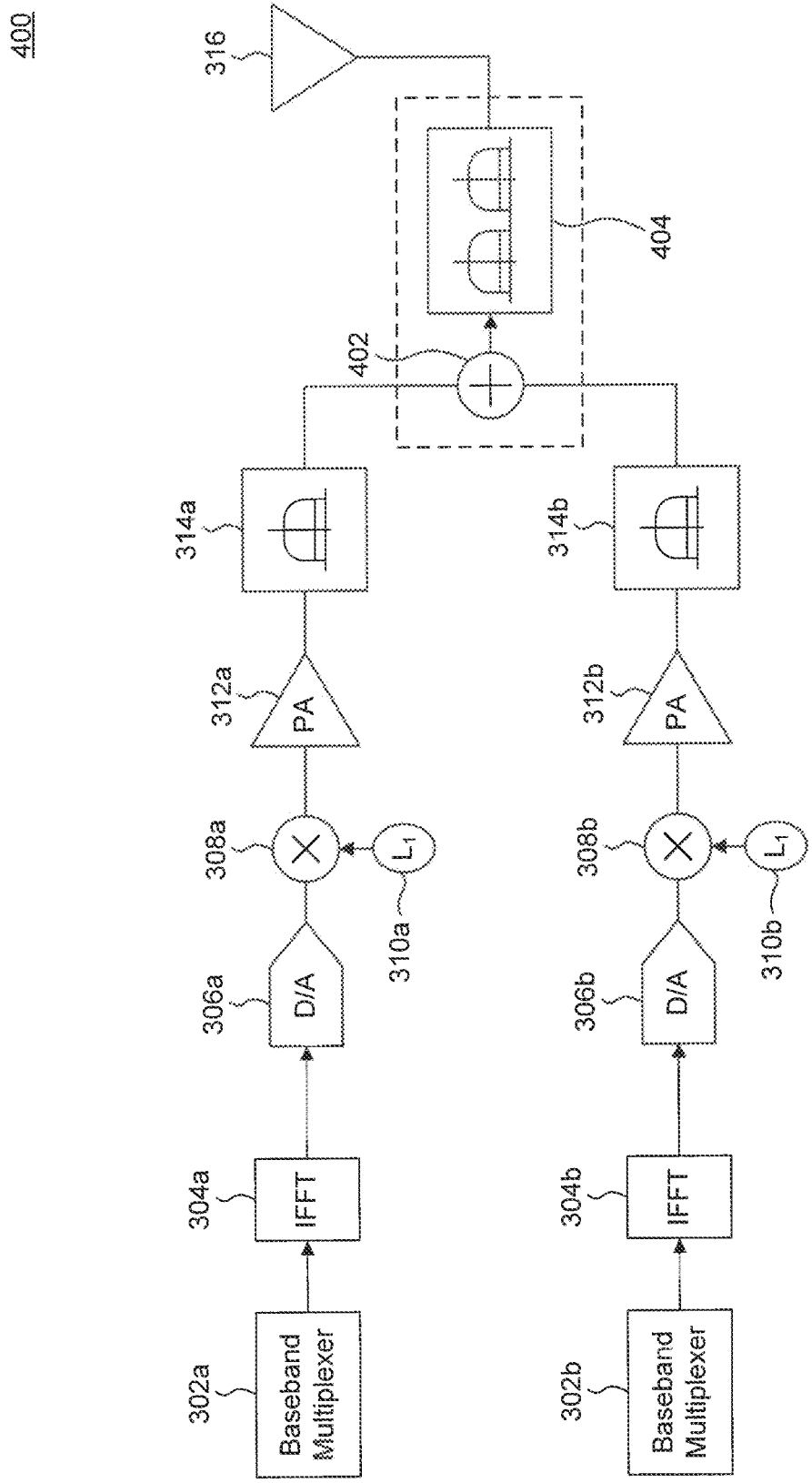
Figure 5:
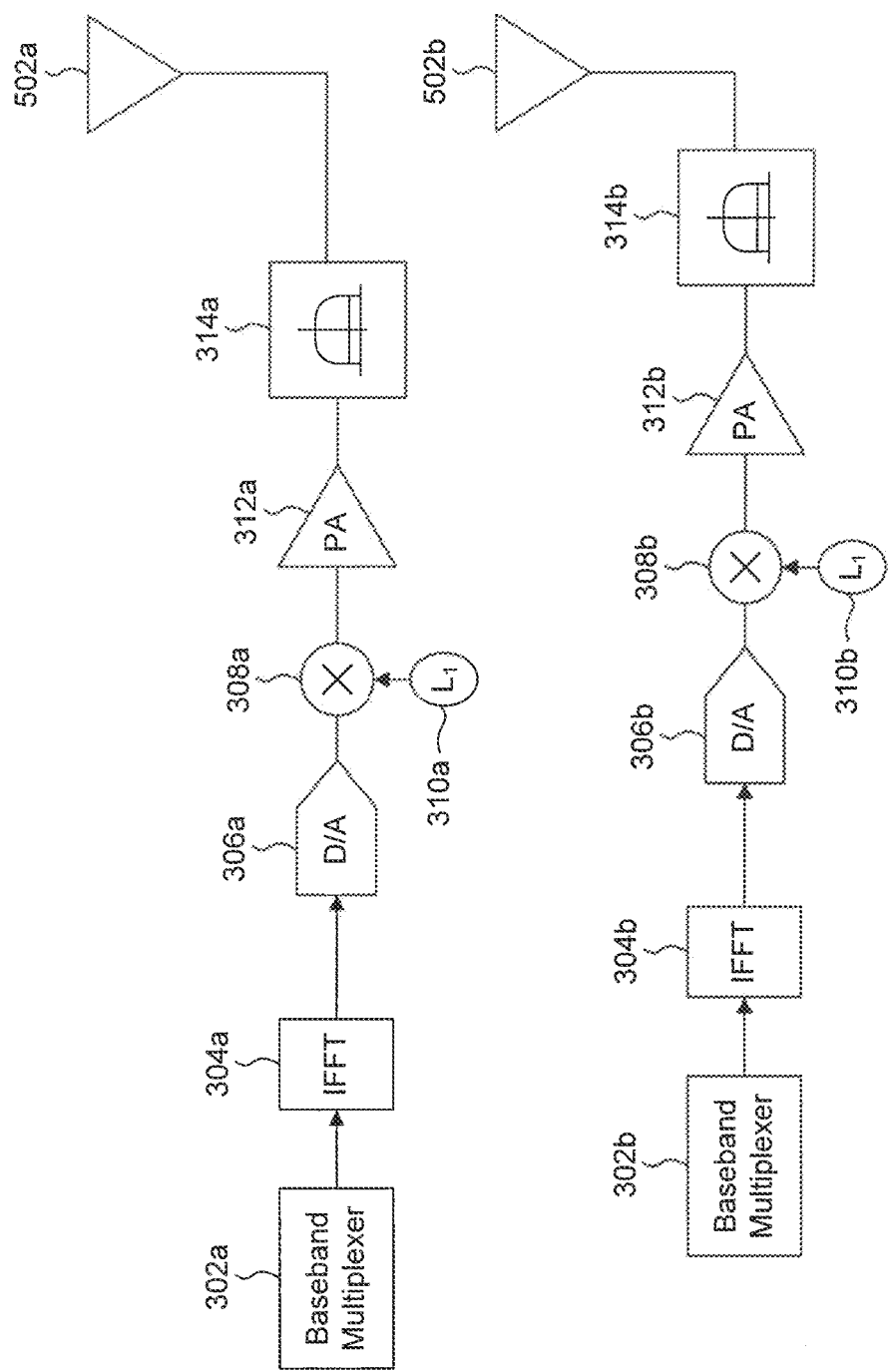

FIGS. 3-5 illustrate example transmitter architectures. The example transmitter architectures of FIGS. 3-5 are provided for the purpose of illustration only and are not limiting of embodiments. The transmitter architectures of FIG. 3-5 represent typical transmitter architectures of an eNodeB (e.g., eNodeB 102) and can each be used to support a plurality of serving cells.

FIG. 3 illustrates an example transmitter architecture 300 having a single transmit chain and a single transmission antenna 316. The transmit chain includes a baseband multiplexer 302, an Inverse Fast Fourier Transform (IFFT) module 304, a digital-to-analog converter (DAC) 306, a mixer 308, a local oscillator 310, a power amplifier (PA) 312, and a radio frequency (RF) filter 314. Transmitter architecture 300 can support intra-band adjacent CA, with CCs aggregated at baseband in multiplexer 302, and then processed simultaneously in the transmit chain and transmitted together by transmission antenna 316. As would be understood by a person of skill in the art based on the teachings herein, the output of IFFT module 304 can be complex, which may require a separate DAC 306 and a separate mixer 308 for processing the real and imaginary components of the output of IFFT module 304. This is assumed to be within the scope of FIG. 3 and also applicable to FIGS. 4 and 5 below. In another embodiment, baseband multiplexer 302 and/or IFFT module 304 are part of a baseband processor of the device comprising transmitter architecture 300.

FIG. 4 illustrates an example transmitter architecture 400 having two transmit chains that share a single transmission antenna 316. Each of the two transmit chains includes a baseband multiplexer 302, an IFFT module 304, a DAC 306, a mixer 308, a local oscillator 310, a PA 312, and a RF filter 314. The outputs of the RF filters 314 of the two transmit chains are combined using a RF combiner 402. The output of RF combiner 402 is filtered by a wideband RF filter 404, before being coupled to transmission antenna 316. Transmitter architecture 400 can support intra-band adjacent CA, intra-band non-adjacent CA, and inter-band CA, with each transmit chain processing a respective CC and with CCs aggregated at RF after PA amplification. To enable CA, the two transmit chains are time synchronized so that the CCs combine appropriately at RF combiner 402 and can be transmitted simultaneously by transmission antenna 316.

FIG. 5 illustrates an example transmitter architecture 500 having two transmit chains with separate respective transmission antennas 502a and 502b. Each of the two transmit chains includes a baseband multiplexer 302, an IFFT module 304, a DAC 306, a mixer 308, a local oscillator 310, a PA 312, and a RF filter 314. Transmitter architecture 500 can support intra-band adjacent CA, intra-band non-adjacent CA, and inter-band CA, with each transmit chain processing a respective CC and CCs aggregated at the receiver side. To enable CA, the two transmit chains are time synchronized so that the CCs are transmitted at the same instant of time. However, the two transmit chains may or may not be spatially collocated. For example, the two transmit chains may be physically located on the same tower such that they can be considered spatially collocated or on different towers of the cellular network.

Figure 6:
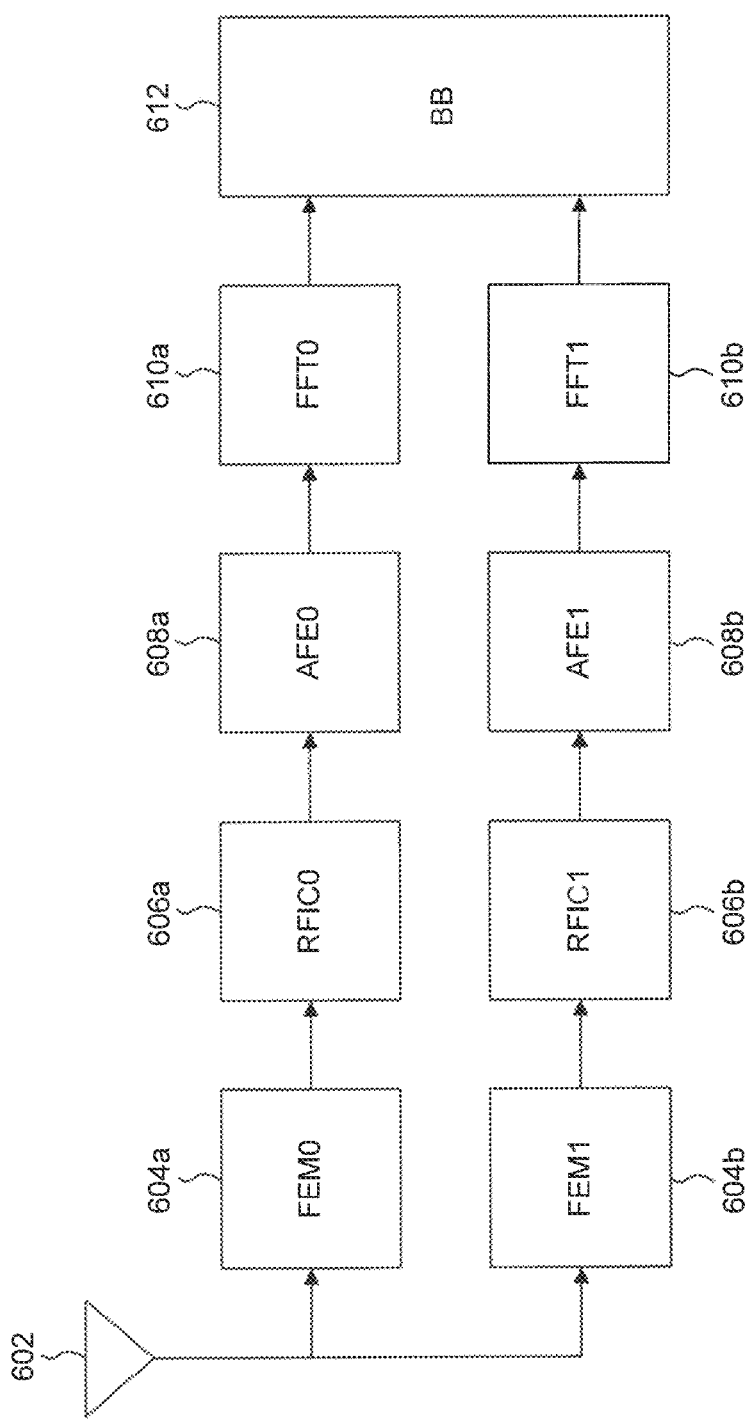
FIGS. 6-8 illustrate example receiver architectures.
Figure 7:
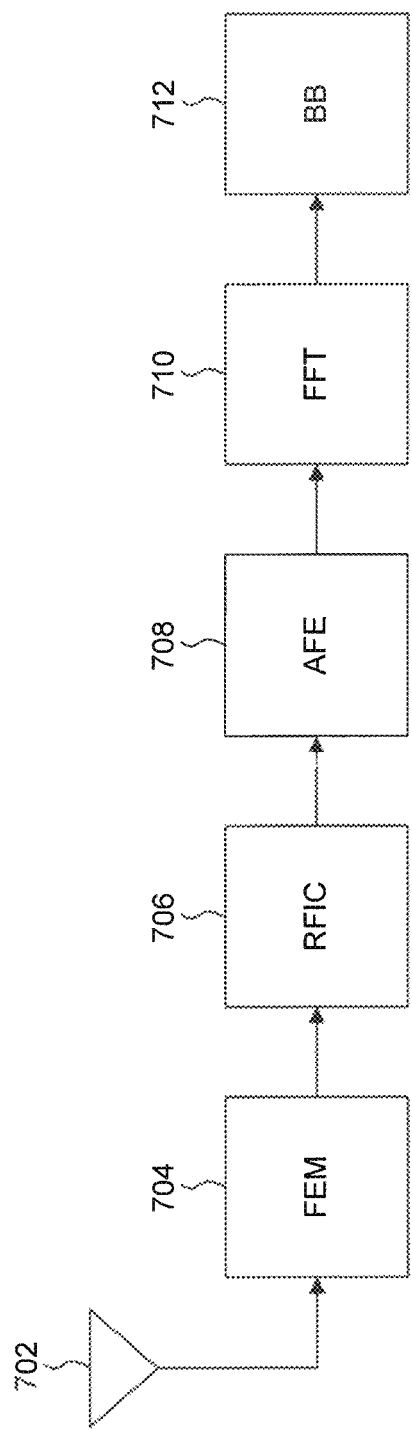
Figure 8:
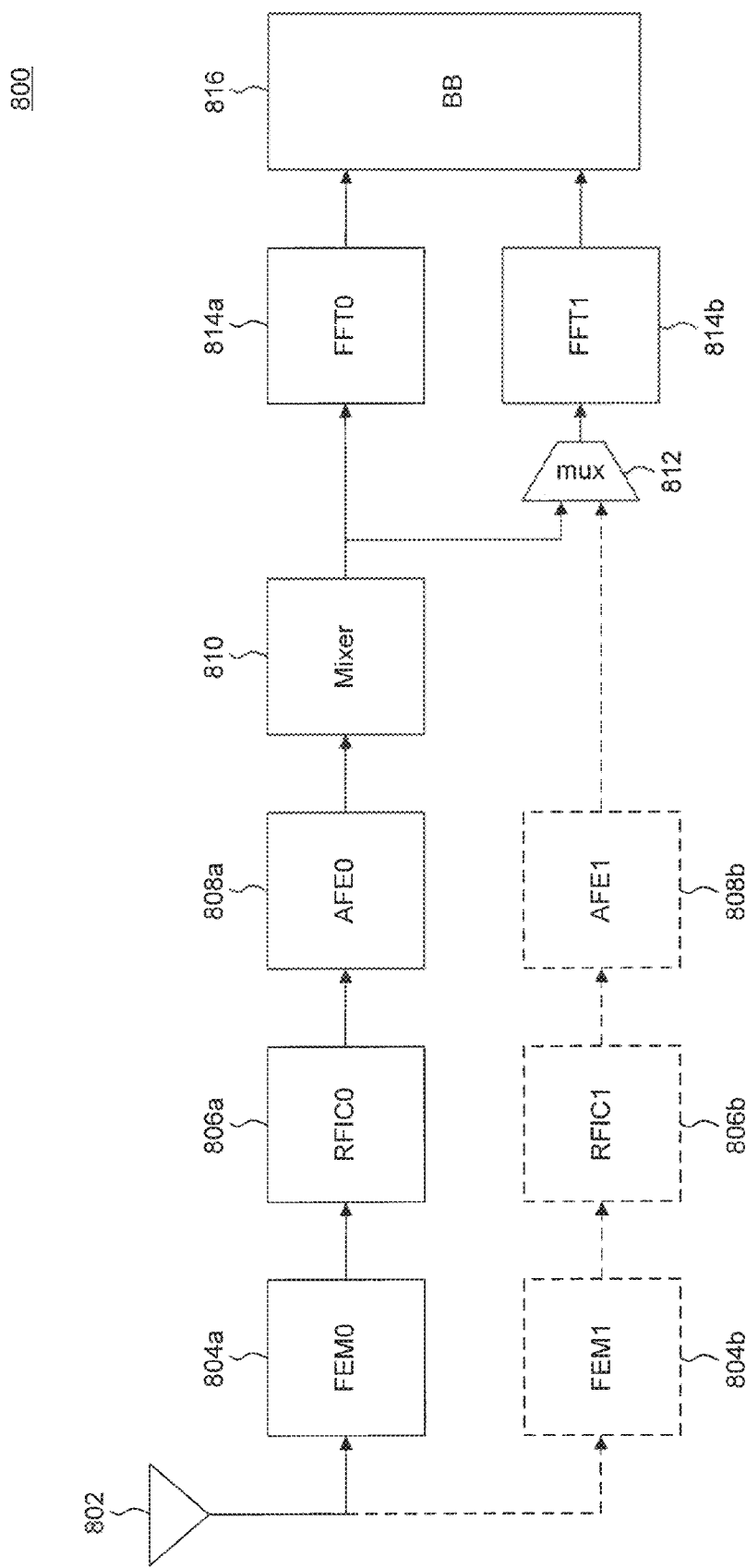

FIGS. 6-8 illustrate example receiver architectures. The example receiver architectures of FIGS. 6-8 are provided for the purpose of illustration only and are not limiting of embodiments. A typical UE (e.g., UE 104) may implement one for a similar one) of the receiver architectures illustrated in FIGS. 6-8. Depending on its implemented receiver architecture, the UE may support one or more forms of CA.

FIG. 6 illustrates an example receiver architecture 600 having two receive chains that share a single receive antenna 602 and a baseband processor 612. Each of the two receive chains includes a front-end module (FEM) 604 (e.g., may include discrete components such as duplexers, switches, and filters), a RF integrated circuit (RFIC) 606 (e.g., may include analog components such as mixers, low-pass filters, etc.), an analog front end (AFE) 608 (e.g., may include mixed signal components such as DACs), and a Fast Fourier Transform (FFT) module 610. Having two receive chains, receiver architecture 600 can support intra-band adjacent CA, intra-band non-adjacent CA, and inter-band CA, with each receive chain processing a respective received CC, for a total of two CCs processed simultaneously.

FIG. 7 illustrates an example receiver architecture 700 haying a single receive chain and a single receive antenna 702. The file receive chain includes a FEM 704, a RFIC 706, an AFE 708, a FFT module 710, and a BB processor 712. With a single receive chain, receiver architecture 700 cannot support CA (without additional side information as will be explained later herein).

FIG. 8 illustrates an example receiver architecture 800 having two receive chains sharing a single receive antenna 802 and a baseband processor 816. Each of the two receive chains includes a FEM 804, a RFIC 806, an AFE 808, and a FFT module 814. Receiver architecture 800 further includes a digital mixer 810 and a multiplexer 812.

Receiver architecture 800 can support intra-band adjacent CA, intra-hand non-adjacent CA, and inter-band CA using two modes of operation. Specifically, for inter-band and intra-band non-adjacent CA, both receive chains are active with each processing a respective received CC. In this mode, the respective outputs of AFEs 808a and 808b are coupled to FFT modules 814a and 814b, respectively. Accordingly, mixer 810 is not active or bypassed such that the output of AFE 808a is coupled to FFT module 814a, and multiplexer 812 couples the output of AFE 808b to FFT module 814b.

For intra-band adjacent CA, one of the two receive chains can be partially disabled and the other receive chain is relied upon exclusively for analog receive processing and digital-to-analog conversion. For example, as shown in FIG. 8, FEM 804b, RFIC 806b, and AFE 808b of the lower receive chain can be turned off, and up to two received CCs can be processed simultaneously in FEM 804a, RFIC 806a, and AFE 808a of the upper processing chain (the terms "lower" and "upper" are used only to distinguish the two receive chains, but do not impart any functional or structural characteristics to the receive chains). Digital mixer 810 receives the output of AFE 808a (which encompasses two received CCs) and using digital processing separates the two CCs into two separate outputs. The two outputs are then provided respectively to FFT modules 814a and 814b (via multiplexer 812).

Embodiments, as further described below, recognize that in the case that intra-band adjacent CCs are transmitted from spatially collocated serving cells or when certain conditions are met by received intra-band adjacent CCs at the UE (hereinafter collectively referred to as adjacent collocated CCs), the received CCs at the UE can be processed simultaneously using a single receive chain. Spatially collocated serving cells as used herein includes serving cells that share a single transmit chain of a transmitter (e.g., the transmit chain of example transmitter 300) or serving cells that use respective (partially or completely separate) spatially collocated transmit chains of a transmitter (e.g., the transmit chains of example transmitter 400, or the transmit chains of example transmitter 500 in the case that they are spatially collocated).

The LTE-Advanced standard, however, does not provide for the cellular network to advertise to the UE if allocated CCs are collocated. The UE also has no mechanism for determining the transmitter architecture used by the eNodeB, in order to infer whether or not allocated CCs are collocated. For example, if the eNodeB adopts example transmitter architecture 300 of FIG. 3, CCs transmitted by the eNodeB will be spatially collocated, but the UE is not made aware of this condition according to Release-10 of the LTE standard. As such, the UE processes the received CCs assuming the worst case scenario that they are not collocated.

Embodiments, as further described below, accordingly provide systems and methods for enabling the cellular network to advertise not only whether or not allocated CCs are intra-band adjacent, but further whether intra-band adjacent CCs are collocated or not; for enabling the UE to advertise its transmit/receive CA capabilities including the support of adjacent collocated CA and/or non-adjacent collocated CA; and for the exploitation of the special conditions provided by adjacent collocated CCs to reduce processing complexity and power consumption for certain types of UE transmitter/receiver architectures and to support intra-band adjacent CA for other types of UE transmitter/receiver architectures.

In the following description of FIGS. 9-11, application of embodiments to enhance the operation of the UE receiver architectures described above in FIGS. 6-8 is described. This description is provided for the purpose of illustration only and is not limiting of embodiments. As would be understood by a person of skill in the art based on the teachings, embodiments can be applied to other types of receiver architectures, including architectures with more than two receive chains. Further, although embodiments are described herein with respect to the case of only two adjacent collocated CCs, a person of skill in the art would appreciated that embodiments can be applied to any number of adjacent collocated CCs.

Figure 9:
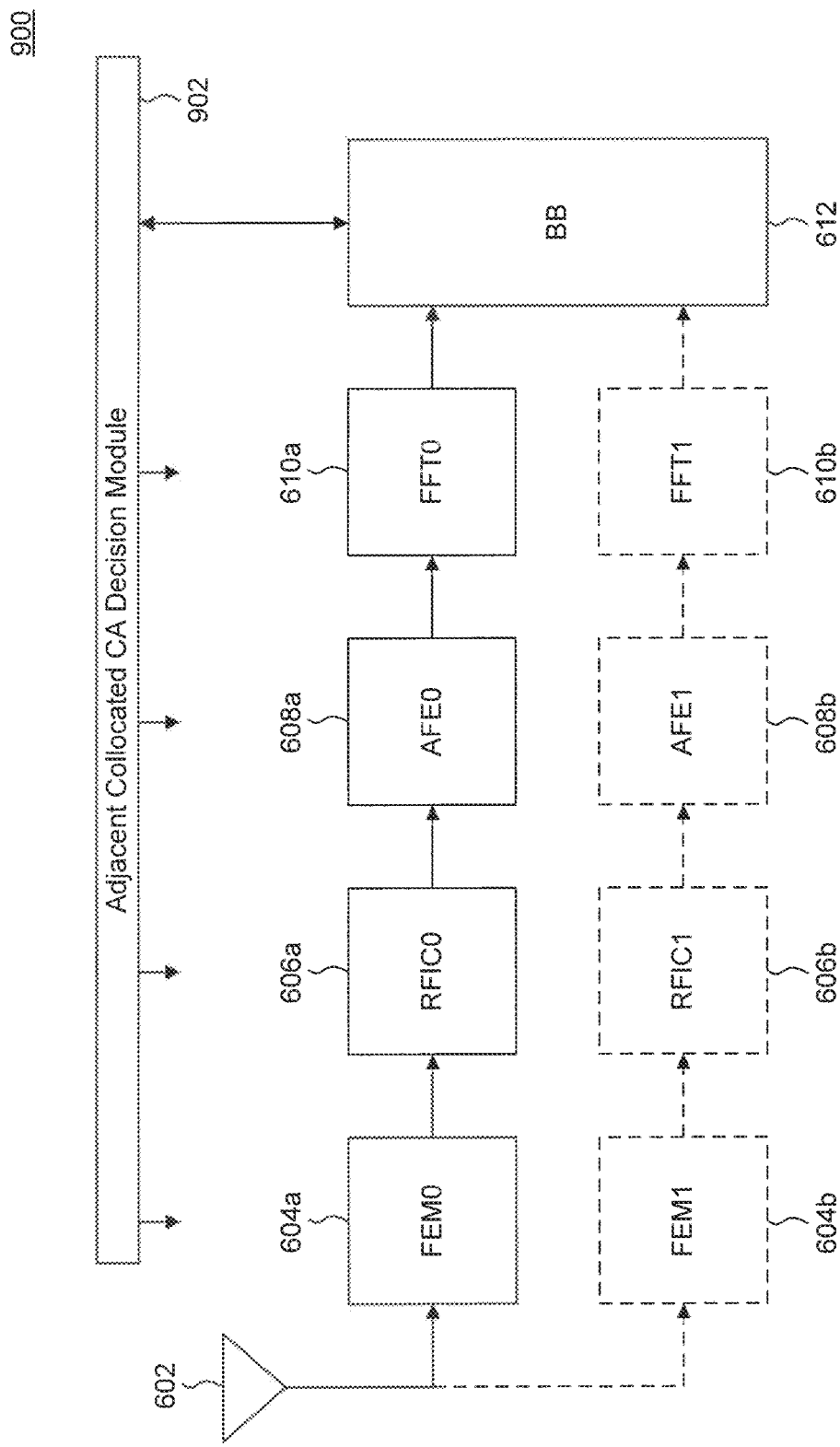
FIGS. 9-11 illustrate example UE receiver architectures according to embodiments.

FIG. 9 illustrates an example UE receiver architecture 900 according to an embodiment. Example UE receiver architecture 900 is an enhanced version of example receiver architecture 600 described above in FIG. 6. Specifically, in addition to the components of receiver architecture 600 described in FIG. 6 above, receiver architecture 900 includes an adjacent collocated CA decision module 902. Decision module 902 may be a standalone module as shown in FIG. 9 or integrated within baseband processor 612.

Decision module 902 is configured to determine whether or not CCs allocated to the UE are adjacent collocated CCs, and to configure the UE receiver architecture accordingly. In another embodiment, decision module 902 can be similarly used to configure an associated transmitter architecture (not shown in FIG. 9) of the UE.

In an embodiment, decision module 902 is capable of making this determination with respect to any number of CCs. In one embodiment, decision module 902 makes the determination based on signaling information transmitted by the network to the UE, indicating that CCs allocated to the UE are adjacent collocated. Decision module 902 may extract the signaling information from a control channel transmitted/broadcast by a serving cell (e.g., Pcell) of the UE. In another embodiment, decision module 902 makes the determination by testing whether or not the received CCs meet requisite conditions for being considered adjacent collocated. This may be the case when the CCs are transmitted simultaneously by the same eNodeB transmission antenna, when the CCs are transmitted simultaneously by respective eNodeB transmission antennas that are collocated, or when the CCs are transmitted by non-collocated eNodeB transmission antennas but still meet the requisite conditions as further described below.

When the CCs are adjacent collocated, the received CCs can be processed together simultaneously using a common receive chain. This is because the received CCs will have common or substantially common time of arrival and received power level at the UE, which allows simultaneous and common analog and digital (including FFT) processing of the received CCs at the UE.

Accordingly, in an embodiment, when decision module 902 determines that downlink CCs allocated to the UE are adjacent collocated, decision module 902 configures receiver architecture 900 to process the CCs simultaneously using a common receive chain. For example, decision module 902 may configure the receiver architecture to turn of the receive chain that includes FEM 604b, RFIC 606b, AFE 608b, and FFT 610b, and to process the CCs together using the receive chain that includes FEM 604a, RFIC 606a, AFE 608a, and FFT 610a. Alternatively, when decision module 902 determines that the CCs allocated to the UE are not adjacent inter-band CCs or intra-band non-adjacent CCs) or are not adjacent collocated, decision module 902 configures receiver architecture 900 to process the CCs using separate receive chains of the receiver. As such, decision module 902 enhances receiver architecture 900 by enabling support of intra-band adjacent CA with reduced complexity and power consumption in certain conditions.

In another embodiment, decision module 902 can be similarly used to configure an associated transmitter architecture of the UE. For example, the transmitter architecture of the UE may be like or similar to transmitter architectures 400 or 500 described above. As such, when decision module 902 determines that uplink CCs allocated to the UE are adjacent collocated (in this case, the CCs are intended to spatially collocated serving cells), decision module 902 may configure the transmitter architecture to use a single transmit chain (including a single baseband multiplexer and/or IFFT) to transmit the uplink CCs. Otherwise, decision module 902 configures the transmitter architecture to use separate transmit chains to transmit the uplink CCs. As such, decision module 902 enhances the UE transmitter by enabling support of intra-band adjacent CA with reduced complexity and power consumption in certain conditions.

Figure 10:
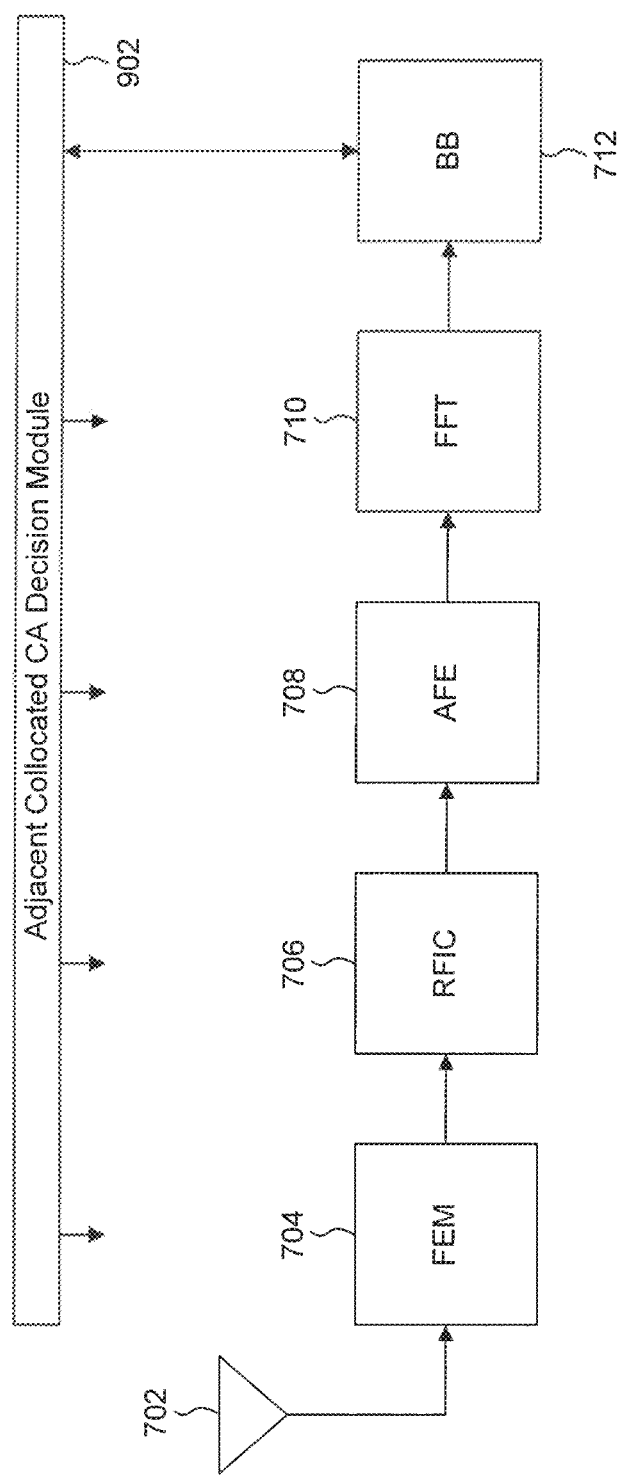

FIG. 10 illustrates another example UE receiver architecture 1000 according to an embodiment. Example UE receiver architecture 1000 is an enhanced version of example receiver architecture 700 described above in FIG. 7. Specifically, in addition to the components of receiver architecture 700 described in FIG. 7 above, receiver architecture 1000 includes a adjacent collocated CA decision module 902. Decision module 902 may be a standalone module as shown in FIG. 10 or integrated within baseband processor 712.

As described above in FIG. 9, decision module 902 is configured to determine whether or not downlink/uplink CCs allocated to the UE are adjacent collocated CCs. When the downlink CCs are adjacent collocated, they can be processed simultaneously using a single receive chain (which is all that is available in receiver architecture 1000). As such, decision module 902 enables receiver architecture 1000 to support CA under certain conditions (when CA cannot be supported at all without decision module 902).

In an embodiment, the UE advertises its downlink (receive) CA capabilities to the eNodeB to begin using CA. In the case of a UE with receiver architecture 1000, the UE advertises to the eNodeB its support for intra-band adjacent collocated CA. The eNodeB then allocates adjacent collocated downlink CCs to the UE (when possible) to enable the UE to use its supported CA mode as much as possible. This increases the downlink bandwidth of the UE.

In another embodiment, decision module 902 can be similarly used to configure an associated transmitter architecture of the UE (not shown in FIG. 10). For example, the transmitter architecture of the UE may be like or similar to transmitter architecture 300 described above. As such, when decision module 902 determines that uplink CCs allocated to the UE are adjacent collocated (in this case, the CCs are intended to spatially collocated serving cells), decision module 902 may configure the transmitter architecture to use CA. As above, the UE may advertise its uplink (transmit) CA capabilities to the eNodeB, in order for the eNodeB to allocate the UE uplink CCs that favor the use of the UE's supported uplink CA mode. This increases the uplink bandwidth of the UE.

As such, decision module 902 enhances receiver architecture 1000 and/or an associated transmitter architecture of the UE by enabling them to support intra-band adjacent CA under certain conditions. In some cases, the cellular network infrastructure may provide these favorable conditions a significant amount of time (e.g., eNodeBs implement spatially collocated serving cells), resulting in the UE supporting CA in the majority of time. This is a significant enhancement compared to receiver architecture 700, which cannot support any form of CA.

Figure 11:
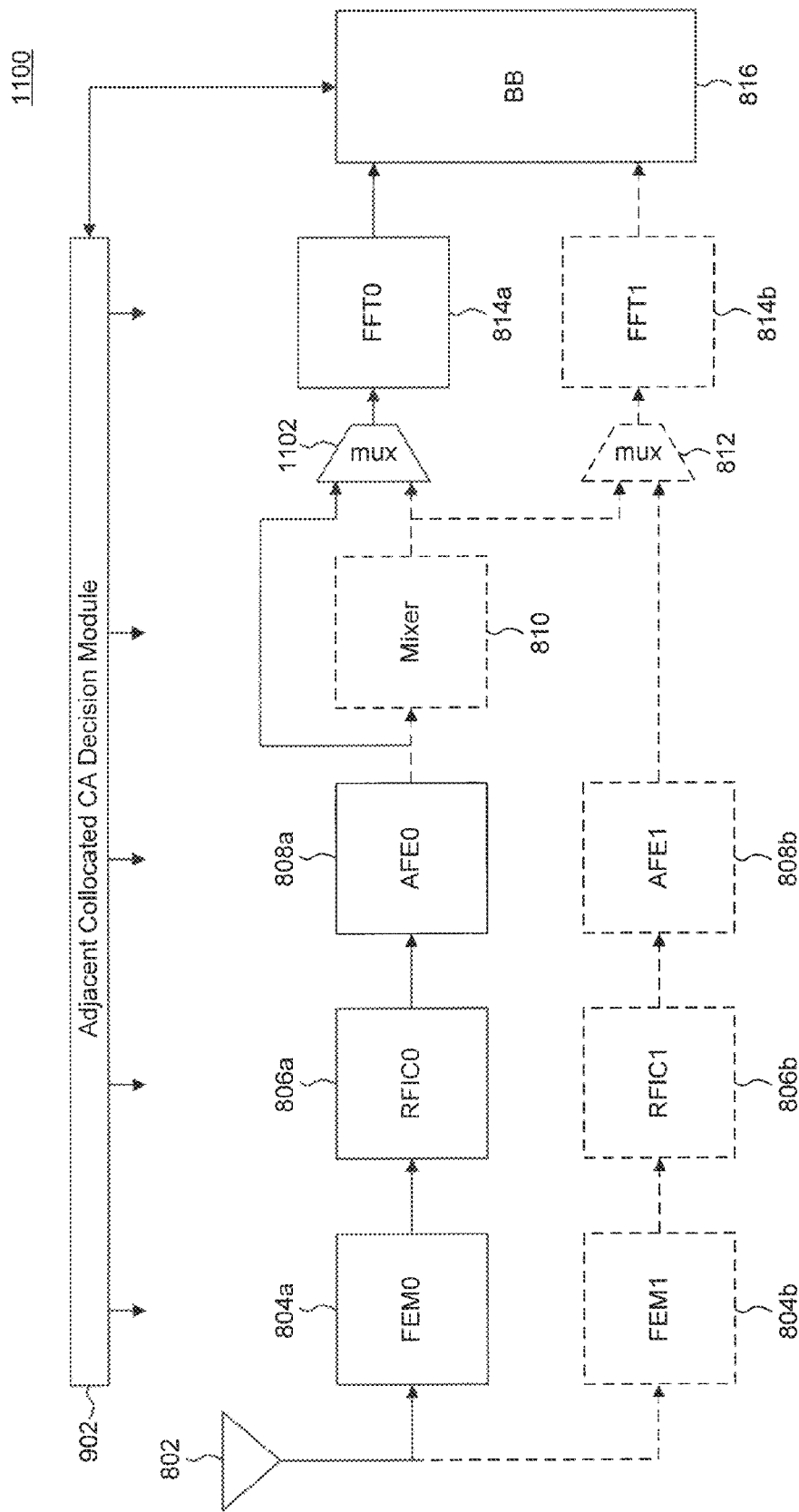

FIG. 11 illustrates another example UE receiver architecture 1100 according to an embodiment. Example UE receiver architecture 1100 is an enhanced version of example receiver architecture 800 described above in FIG. 8. Specifically, in addition to the components of receiver architecture 800 described in FIG. 8 above, receiver architecture 1100 includes a adjacent collocated CA decision module 902 and a multiplexer 1102. Decision module 902 may be a standalone module as shown in FIG. 11 or integrated within baseband processor 816.

As described above in FIG. 9, decision module 902 is configured to determine whether or not downlink/uplink CCs allocated to the UE are adjacent collocated CCs. When the downlink CCs are adjacent collocated, they can be processed simultaneously using a single receive chain. Accordingly, in an embodiment, when decision module 902 determines that downlink CCs allocated to the UE are adjacent collocated, decision module 902 configures receiver architecture 1100 to process the CCs simultaneously using a common receive chain. For example, decision module 902 may configure the receiver architecture to turn off completely (or partially) the receive chain that includes FEM 804b, RFIC 806b, AFE 808b, and FFT 814b, and to process the CCs together using the receive chain that includes FEM 804a, RFIC 806a, AFE 808a, and FFT 814a. Additionally, digital mixer 810 is bypassed and can also be turned off, and multiplexer 1102 is used to couple the output of AFE 808a directly to FFT 814a. As such, decision module 902 enhances receiver architecture 1100 by enabling support of intra-band adjacent CA with reduced complexity and power consumption in certain conditions.

Alternatively, when decision module 902 determines that the downlink CCs allocated to the UE are not adjacent (e.g., inter-band CCs or intra-band non-adjacent CCs) or are not collocated, decision module 902 configures receiver architecture 1100 to process the CCs as described above with respect to receiver architecture 800 using both receive chains.

Figure 12:
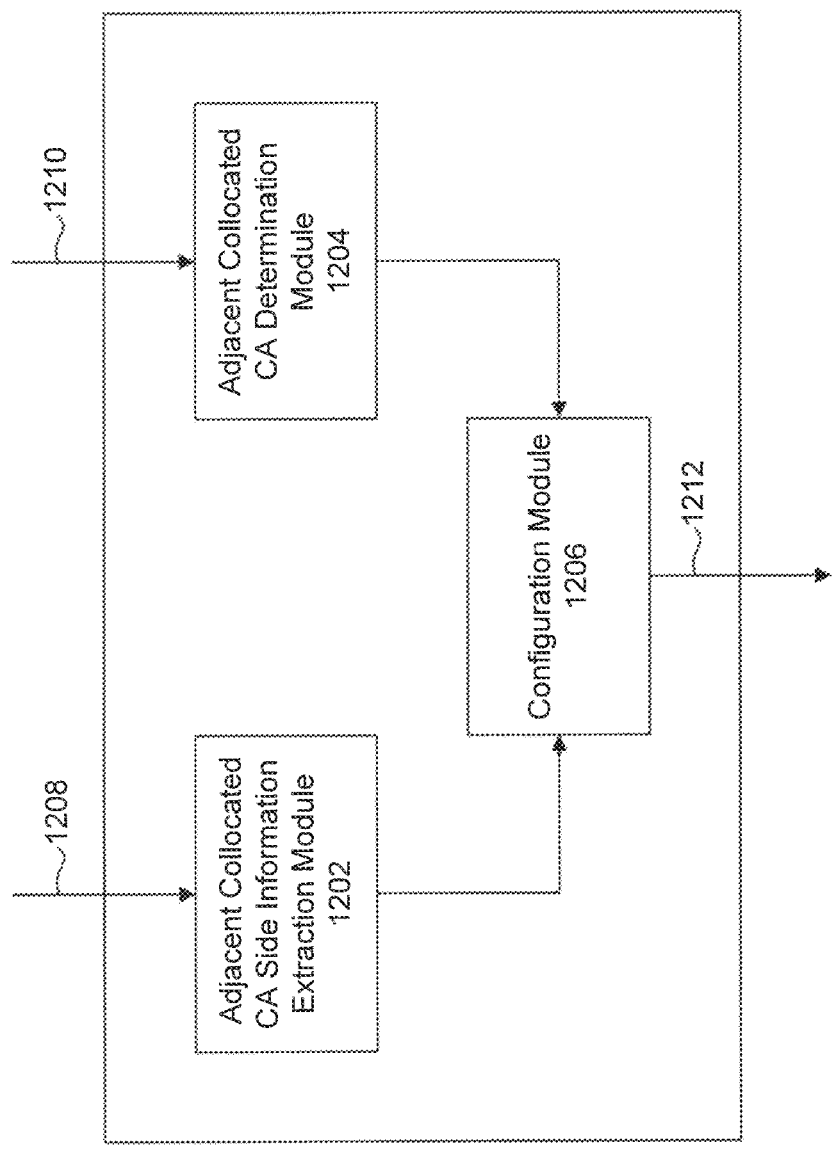
FIG. 12 illustrates an example adjacent collocated CA decision module according to an embodiment.

FIG. 12 illustrates an example adjacent collocated CA decision module 1200 according to an embodiment. Example decision module 1200 is provided for the purpose of illustration only and is not limiting of embodiments. Example decision module 1200 may be an embodiment of decision module 902 described above. As shown in FIG. 12, decision module 1200 includes a adjacent collocated CA side information extraction module 1202, an adjacent collocated CA determination module 1204, and a configuration module 1206. In other embodiments, decision module 1200 may implement only one or the other of modules 1202 and 1204.

Module 1202 is configured to extract signaling information from a control channel 1208 transmitted/broadcast by the network (e.g., by a serving cell of the UE) to the UE. In an embodiment, the signaling information include whether (downlink and/or uplink) CCs allocated to the UE are inter-band, intra-band adjacent, or intra-band non-adjacent, and further, when the CCs are intra-band adjacent, whether the CCs are collocated or non-collocated. In an embodiment, the UE exchanges its transmit and/or receive CA capabilities with the network (using existing CA messaging framework) prior to the network beginning to allocate CCs to the UE. The allocation of CCs to the UE may thus take into account the CA capabilities of the UE, in order to increase the usage of CA across the network.

In an embodiment, module 1202 examines the extracted signaling information to determine whether or not CCs allocated to the UE are adjacent collocated. Module 1202 provides the result of its determination to configuration module 1206.

Module 1204 is configured to determine whether downlink CCs allocated to the UE are adjacent collocated without relying on signaling information from the network. Instead, module 1204 is configured to examine received transmissions 1210 associated with the downlink CCs to infer therefrom whether the CCs are adjacent collocated. Module 1204 provides the result of its determination to configuration module 1206.

In an embodiment, for example with respect to two CCs, module 1204 computes, using received transmissions 1210, a time of arrival difference between respective times of arrival of the CCs at the UE, a frequency offset difference between respective frequency offsets associated with the CCs at the UE, and/or a power level difference between respective received power levels of the CCs at the UE. Module 1204 compares the time of arrival difference, the frequency offset difference, and/or the power level difference to respective thresholds (or ranges) to determine Whether the CCs can be processed simultaneously using a common receive chain. If the time of arrival difference, the frequency offset difference, and/or the power level difference are within their respective ranges, then the CCs are determined to be adjacent collocated. This may be the case when the CCs are transmitted simultaneously by the same eNodeB transmission antenna, when the CCs are transmitted simultaneously by respective eNodeB transmission antennas that are collocated, or when the CCs are transmitted by non-collocated eNodeB transmission antennas but still meet the requisite time of arrival/power conditions as described above.

As would be understood by a person of skill in the art based on the teachings herein, module 1204 may also examine transmissions associated with more than two CCs to determine whether or not they are adjacent collocated. For example, module 1204 may compute variances of the times of arrival/received power levels associated with the CCs and compare the computed variances to appropriate thresholds to determine whether the CCs can be processed simultaneously using a common receive chain.

Figure 13:
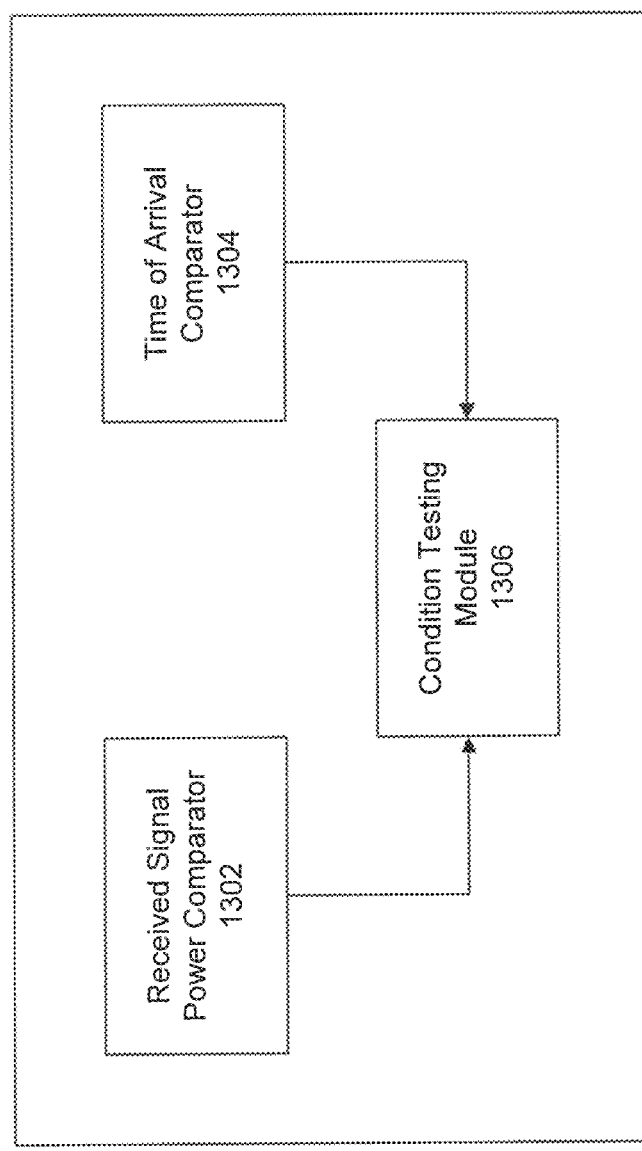
FIG. 13 illustrates an example adjacent collocated CA determination module according to an embodiment.

FIG. 13 illustrates an example adjacent collocated. CA determination module 1300 according to an embodiment. Example module 1300 is provided for the purpose of illustration and is not limiting. Example module 1300 may be an embodiment of module 1204 described above. As shown in FIG. 13, module 1300 includes a received signal power comparator 1302, a time of arrival comparator 1304, and a condition testing module 1306. In other embodiments, module 1300 may implement only one or the other of modules 1302 and 1304.

Comparator 1302 is configured to perform received power level comparison as described above with respect to FIG. 12. In embodiments, comparator 1302 can compare received power levels associated with a plurality of CCs. For example, when only two CCs are being compared, comparator 1302 may compute a power level difference between respective received power levels of the CCs. When more than two CCs are being compared, comparator 1302 may compute a variance based on the respective received power levels of the CCs. Comparator 1302 provides the result of its comparison to condition testing module 1306.

Comparator 1304 is configured to perform time of arrival comparison as described above with respect to FIG. 12. In embodiments, comparator 1304 can compare times of arrival associated with a plurality of CCs. For example, when only two CCs are being compared, comparator 1304 may compute a time of arrival difference between respective times of arrival of the CCs. When more than two CCs are being compared, comparator 1304 may compute a variance based on the respective times of arrival of the CCs. Comparator 1304 provides the result of its comparison to condition testing module 1306. In another embodiment, comparator 1304 can also compute a frequency offset difference/variance between respective frequency offsets associated with the CCs and compare the frequency offset difference/variance to determined thresholds.

Condition testing module 1306 uses the comparison results of one or more of modules 1302 and 1304 to determine whether or not received CCs have common or substantially common received power level and/or time of arrival at the UE, which allows simultaneous and common analog and digital (including FFT) processing of the received CCs at the UE. In an embodiment, module 1306 compares the result of module 1302 to a first predetermined range, and the result of module 1304 to a second predetermined range. If the two results are within the first and second predetermined ranges respectively, then module 1306 determines that the received CCs are collocated. Condition testing module 1306 may also determine whether or not the CCs are adjacent by examining the respective frequency spectrums of the received CCs.

In an embodiment, the first predetermined range (which relates to received power) is selected based on Automatic Gain Control (AGC) capabilities at the UE. Specifically, the first predetermined range is selected to ensure that the received CCs are determined to be collocated only when the power level difference (for two CCs) or power level variance (for more than two CCs) is not too large for adequate AGC operation (the range should not be very large to cause undesired quantization effects in the AGC).

In an embodiment, the second predetermined range (which relates to time of arrival) is selected based on FFT capabilities at the UE. Specifically, the second predetermined range is selected to ensure that the received CCs are determined to be collocated only when the time of arrival difference (for two CCs) or time of arrival variance (for more than two CCs) is not too large to preclude simultaneous FFT processing. In an embodiment, the times of arrival of the CCs need to be close enough to allow a common starting point (trigger position) for the FFT. In an embodiment, for two CCs, the respective transmissions need to be within a cyclic prefix (CP) duration (minus a suitable margin that is related to the channel delay spread) of each other.

Returning to FIG. 12, configuration module 1206 uses the results from one or more of modules 1202 and 1204 to configure the transmitter/receiver architecture of the UE as described above. For example, when the CCs are indicated to be adjacent collocated, (for downlink CCs) configuration module 1206 may configure the receiver architecture to process the CCs simultaneously using a common receive chain; or (for uplink CCs) may configure the transmitter architecture to process the CCs simultaneously using a common transmit chain of the transmitter. Alternatively, when the CCs are determined to be not collocated or not-adjacent, (for downlink CCs) configuration module 1206 may configure the receiver architecture to process the CCs using separate receive chains; or (for uplink CCs) may configure the transmitter architecture to process the CCs using separate transmit chains of the transmitter.

FIGS. 14-17 are flowcharts of example processes of operating a wireless device according to embodiments. The processes of FIGS. 14-17 can be performed by system embodiments described above.

Figure 14:
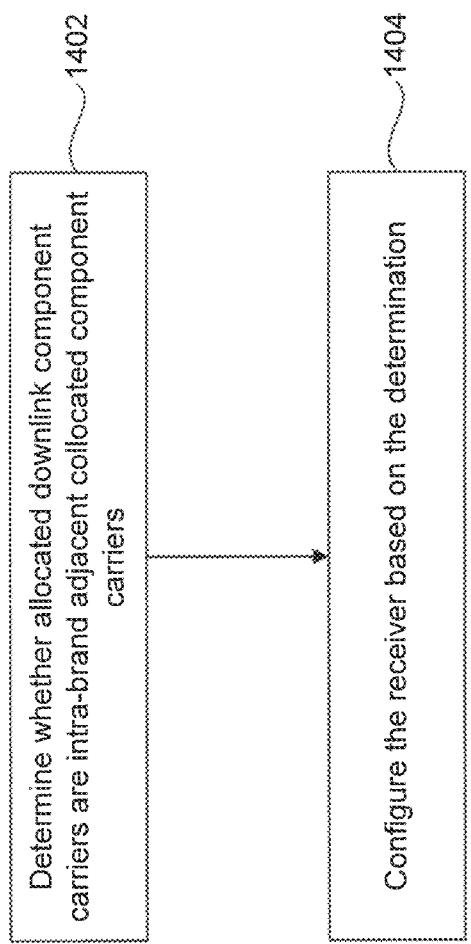
FIGS. 14-17 are flowcharts of example processes of operating a wireless device according to embodiments.

FIG. 14 illustrates an example process 1400 according to an embodiment. Process 1400 can be performed by a UE, such as UE 104, for example. As shown in FIG. 14, process 1400 begins in step 1402, which includes determining whether or not downlink CCs allocated to the UE are adjacent collocated. In an embodiment, the CCs are collocated when associated with respective spatially collocated serving cells. In another embodiment, the CCs are considered collocated when they meet requisite conditions for common receive processing at the UE.

In an embodiment, step 1402 further includes extracting signaling information from a control channel transmitted by a serving cell of the UE. In an embodiment, the signaling information includes whether (downlink and/or uplink) CCs allocated to the UE are inter-band, intra-band adjacent, or intra band non-adjacent, and further, when the CCs are intra-band adjacent, whether the CCs are collocated or non-collocated.

In another embodiment, step 1402 further includes, additionally or alternatively, computing a time of arrival difference/variance between respective times of arrival of the CCs at the UE; computing a power level difference/variance between respective power levels of the CCs at the UE; comparing the time of arrival difference/variance to a first predetermined range; comparing the power level difference/ variance to a second predetermined range. The CCs are determined to be collocated if the time of arrival difference/variance is within the first predetermined range and the power level difference variance is within the second predetermined range. In an embodiment, the first predetermined range is a function of a cyclic prefix duration defined by a communications protocol used by the UE.

Subsequently, in step 1404, process 1400 includes configuring the receiver of the UE based on the determination performed in step 1402. In an embodiment, step 1404 can be performed by a module such as configuration module 1206 described above in FIG. 12.

In an embodiment, when the CCs are determined to be collocated, step 1404 further includes configuring the receiver to process the CCs simultaneously using a common receive chain of the receiver. This includes, in an embodiment, processing the CCs simultaneously using a common FFT module of the common receive chain. Step 1404 may further include powering down at least one additional receive chain of the receiver. In another embodiment, where the UE includes a single receive chain, when the CCs are determined to be collocated, step 1404 further includes configuring the receiver to use CA processing for the CCs.

Alternatively, when the CCs are determined to be not collocated or not adjacent, step 1404 further includes configuring the receiver to process the CCs using separate receive chains of the receiver.

Figure 15:
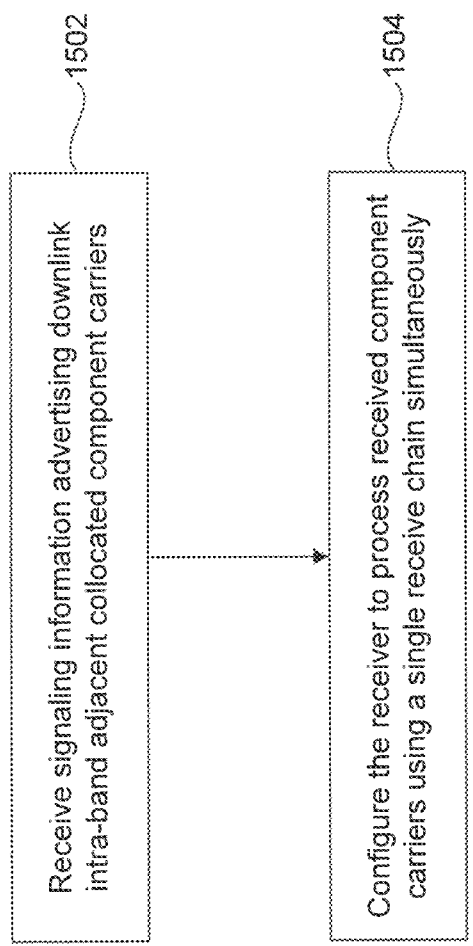

FIG. 15 illustrates another example process 1500 according to an embodiment. Process 1500 can be performed by a UE, such as UE 104, for example. As shown in FIG. 15, process 1500 begins in step 1502, which includes receiving signaling information advertising downlink adjacent collocated CCs to the UE. In an embodiment, step 1502 can be performed by a module such as module 1202 described above in FIG. 12. In an embodiment, step 1502 further includes decoding a control channel transmitted by a serving cell of the UE to extract CA aggregation related information from the control channel.

Subsequently, in step 1504, process 1500 includes configuring the receiver of the UE to process received CCs simultaneously using a single receiver chain. This includes, in an embodiment, processing the CCs simultaneously using a common FFT module of the single receive chain. In embodiment, the receiver can be configured dynamically to switch from one configuration to another depending on the CCs received by the UE. This is similarly the case for the transmitter and/or the baseband processor as farther described below.

Figure 16:
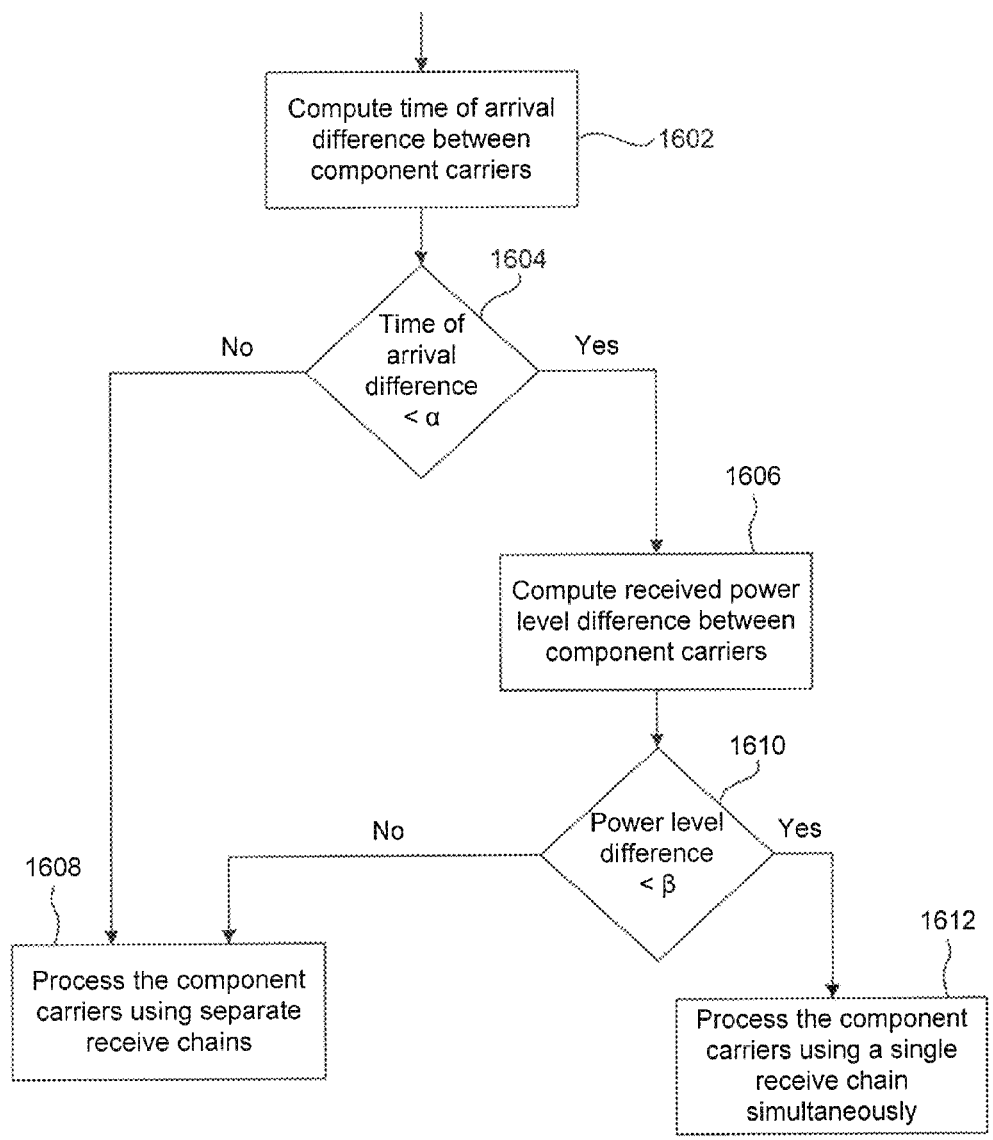

FIG. 16 illustrates another example process 1600 according to an embodiment. Process 1600 can be performed by a UE having an architecture with more than one receive chain, such as receiver architectures 600 and 800, for example.

As shown in FIG. 16, process 1600 begins in step 1602, which includes computing a time of arrival difference/variance between respective times of arrival of received CCs. In an embodiment, step 1602 can be performed by a module such as comparator 1304 described above in FIG. 13. Subsequently, process 1600 proceeds to step 1604, which includes comparing the time of arrival difference/variance to a predetermined range α. In an embodiment, the predetermined range α is selected based on FFT capabilities at the UE. Specifically, the predetermined range α is selected to ensure that the received CCs are determined to be collocated only when the time of arrival difference (for two CCs) or time of arrival variance (for more than two CCs) is not too large to preclude simultaneous FFT processing. In an embodiment, the times of arrival of the CCs need to be close enough to allow a common starting point (trigger position) for the FFT. In an embodiment, for two CCs, the respective transmissions need to be within a cyclic prefix (CP) duration (minus a suitable margin that is related to the channel delay spread) of each other.

If the time of arrival difference/variance is within the predetermined range α in step 1604, process 1600 proceeds to step 1606. Otherwise, process 1600 proceeds to step 1608, which includes processing the CCs using separate receive chains of the receiver.

Step 1606 includes computing a received power level difference/variance between respective power levels of the CCs at the UE. In an embodiment, step 1606 can be performed by a module such as comparator 1302. Subsequently, process 1600 includes comparing the received power level difference/variance to a predetermined range β. In an embodiment, the predetermined range β is selected based on AGC capabilities at the UE. Specifically, the predetermined range β is selected to ensure that the received CCs are determined to be collocated only when the power level difference (for two CCs) or power level variance (for more than two CCs) is not too large for adequate AGC operation.

If the received power level difference/variance is within the predetermined range β in step 1606, process 1600 proceeds to step 1612, which includes processing the CCs simultaneously using a single receive chain of the receiver. Otherwise, process 1600 proceeds to step 1608, which includes processing the CCs using separate receive chains of the receiver.

Figure 17:
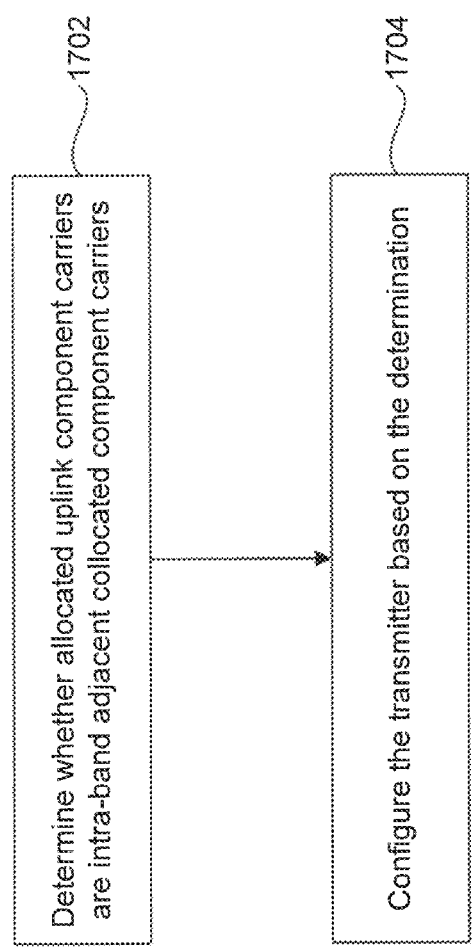

FIG. 17 illustrates another example process 1700 according to an embodiment. Process 1700 can be performed by a UE, such as UE 104, for example. As shown in FIG. 17, process 1700 begins in step 1702 which includes determining whether or not uplink CCs allocated to the UE are adjacent collocated. In an embodiment, the CCs are collocated when associated with respective spatially collocated serving cells.

In an embodiment, step 1702 further includes extracting signaling information from a control channel transmitted by a serving cell of the UE. In an embodiment, the signaling information includes whether (downlink and/or uplink) CCs allocated to the UE are inter-band, intra-band adjacent, or intra-band non-adjacent, and further, when the CCs are intra-band adjacent, whether the CCs are collocated or non-collocated.

Subsequently, in step 1704, process 1700 includes configuring the transmitter of the UE based on the determination performed in step 1702. In an embodiment, when the CCs are determined to be collocated, step 1704 further includes configuring the transmitter to process the CCs simultaneously using a common transmit chain of the transmitter. This includes, in an embodiment, processing the CCs simultaneously using a common baseband multiplexer and/or IFFT module. In an embodiment, as described above with respect to FIG. 3, the baseband multiplexers are part of the baseband processor, and thus step 1704 includes configuring the baseband processor to turn on/off one or more baseband multiplexers as needed by the configuration. Step 1704 may further include powering down at least one additional transmit chain of the transmitter. In another embodiment, where the UE includes a single transmit chain, when the CCs are determined to be collocated, step 1704 further includes configuring the transmitter to use CA processing for the CCs.

Alternatively, when the CCs are determined to be not collocated or not adjacent, step 1704 further includes configuring the transmitter architecture to use separate transmit chains to transmit the uplink CCs.

Figure 18:
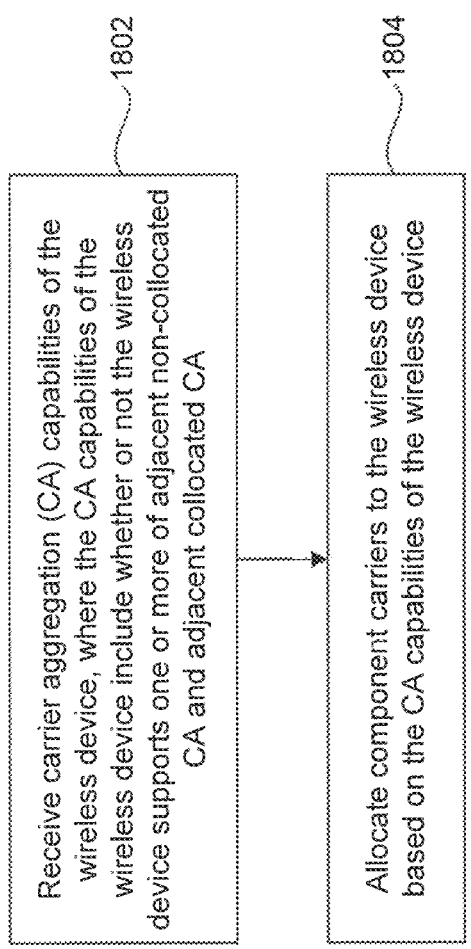
FIG. 18 is a flowchart of an example process for increasing bandwidth allocated to a wireless device according to an embodiment.

As would be understood by a person of skill in the art based on the teachings herein, the transmitter can be configured dynamically to switch from one configuration to another based on the CCs allocated to the UE. The dynamic configuration can change the configuration with respect to any combination of individual components of the transmitter FIG. 18 illustrates an example process 1800 for increasing bandwidth allocated to a wireless device, such as a UE. Process 1800 can be performed by a cellular network infrastructure that supports CA.

As shown in FIG. 18, process 1800 begins in step 1802, which includes receiving carrier aggregation (CA) capabilities of the wireless device. In an embodiment, the CA capabilities of the wireless device include transmit and/or receive CA processing capabilities. Step 1802 may be performed by an eNodeB of the cellular network during a CA exchange with the wireless device. The CA exchange may be performed between the wireless device and a Pcell serving the wireless device.

In an embodiment, the CA capabilities of the wireless device include whether or not the wireless device supports one or more of adjacent non-collocated CA and adjacent collocated CA. In an embodiment, the processing capabilities that need to be available at the UE for supporting one or the other type of adjacent CA can be defined by the standard. Alternatively or additionally, the CA capabilities of the wireless device are conveyed to the eNodeB by one or more of a maximum allowable time of arrival difference variance between received CCs and a maximum allowable power level difference between received CCs for adjacent CA processing at the wireless device.

Subsequently, in step 1804, process 1800 includes allocating CCs to the wireless device based on the CA capabilities of the wireless device. In an embodiment, when the wireless device supports adjacent non-collocated CA, step 1804 includes allocating adjacent collocated or adjacent non-collocated CCs to the wireless device. Alternatively, when the wireless device supports only adjacent collocated CA, step 1804 includes allocating only adjacent collocated CCs to the wireless device.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. A method of operating a wireless device, comprising:
   determining, at the wireless device, whether or not component carriers allocated to the wireless device are adjacent and collocated based on signaling information from a control channel transmitted by a serving cell of the wireless device or based on at least one of: a time of arrival difference between respective times of arrival of the component carriers, a power level difference between respective received power levels of the component carriers, or a frequency offset difference between respective frequency offsets of the component carriers; and
   configuring at least one of: a receiver, a transmitter, and a baseband processor of the wireless device responsive to said determining.

2. The method of claim 1, wherein the component carriers are collocated when associated with respective spatially collocated serving cells.

3. The method of claim 1, wherein determining whether or not the component carriers are adjacent and collocated comprises extracting signaling information from the control channel transmitted by the serving cell of the wireless device.

4. The method of claim 1, wherein determining whether or not the component carriers are adjacent and collocated comprises:
   computing at least one of: the time of arrival difference between the respective times of arrival of the component carriers, the power level difference between the respective received power levels of the component carriers, or the frequency offset difference between the respective frequency offsets of the component carriers; and
   comparing at least one of: the time of arrival difference, the frequency offset difference, or the power level difference to a respective predetermined range,
   wherein the component carriers are determined to be collocated if one or more of the time of arrival difference, the frequency offset difference, and the power level difference is within the respective predetermined range.

5. The method of claim 4, wherein the respective predetermined range is a function of a cyclic prefix duration defined by a communications protocol used by the wireless device.

6. The method of claim 1, wherein the component carriers are determined to be collocated, and wherein configuring the receiver comprises:
   configuring the receiver to process the component carriers simultaneously using a common receive chain of the receiver.

7. The method of claim 6, further comprising:
   processing the component carriers simultaneously using a common Fast Fourier Transform (FFT) module of the common receive chain.

8. The method of claim 6, further comprising:
   powering down at least one additional receive chain of the receiver.

9. The method of claim 1, wherein the component carriers are determined to be not collocated or not adjacent, and wherein configuring the receiver comprises:
   configuring the receiver to process the component carriers using separate receive chains of the receiver.

10. The method of claim 1, wherein said determining comprises:
monitoring one or more of: an uplink timing correction command, an uplink frequency correction command, and an uplink power correction command from a cellular network.

11. The method of claim 1, wherein the component carriers are determined to be collocated, and wherein configuring the transmitter comprises:
configuring the transmitter to process the component carriers simultaneously using a common transmit chain of the transmitter.

12. The method of claim 1, wherein said configuring comprises:
transitioning at least one of: the receiver, the transmitter, and the baseband processor of the wireless device from a first configuration to a second configuration responsive to said determining.

13. The method of claim 1, wherein configuring the transmitter responsive to said determining comprises:
turning on or off at least one of an Inverse Fast Fourier Transform (IFFT) module and a power amplifier responsive to said determining.

14. A wireless device, comprising:
a transmitter;
a receiver; and
a decision module, implemented at least in part in circuitry, configured to determine, at the wireless device, whether or not component carriers allocated to the wireless device are adjacent and collocated based on signaling information from a control channel transmitted by a serving cell of the wireless device or based on at least one of: a time of arrival difference between respective times of arrival of the component carriers, a power level difference between respective received power levels of the component carriers, or a frequency offset difference between respective frequency offsets of the component carriers, and to configure at least one of the transmitter and the receiver responsive to said determination.

15. The wireless device of claim 14, wherein the component carriers are collocated when associated with respective spatially collocated serving cells.

16. The wireless device of claim 14, wherein the decision module comprises:
a carrier aggregation (CA) information extraction module, implemented at least in part in the circuitry, configured to extract the signaling information from the control channel transmitted by the serving cell of the wireless device.

17. The wireless device of claim 14, wherein the decision module comprises a determination module, implemented at least in part in the circuitry, configured to:
compute at least one of: the time of arrival difference between the respective times of arrival of the component carriers, the power level difference between the respective received power levels of the component carriers, or the frequency offset difference between the respective frequency offsets of the component carriers;
compare at least one of: the time of arrival difference, the frequency offset difference, or the power level difference to a respective predetermined range; and
determine whether or not the component carriers are responsive to the comparison of at least one of the time of arrival difference, the frequency offset difference, and the power level difference to the respective predetermined range.

18. The wireless device of claim 14, wherein the decision module comprises a configuration module, implemented at least in part in the circuitry, configured, when the component carriers are determined to be collocated, to:
configure the receiver to process the component carriers using a common receive chain of the receiver; or
configure the transmitter to process the component carriers using a common transmit chain of the transmitter.

19. The wireless device of claim 18, wherein the configuration module is further configured, when the component carriers are determined to be not collocated or not-adjacent, to:
configure the receiver to process the component carriers using separate receive chains of the receiver; or configure the transmitter to process the component carriers using separate transmit chains of the transmitter.

20. A method of operating a wireless device, comprising:
determining whether or not component carriers allocated to the wireless device are collocated based on at least one of: a time of arrival difference between respective times of arrival of the component carriers, a power level difference between respective received power levels of the component carriers, or a frequency offset difference between respective frequency offsets of the component carriers; and
configuring at least one of: a receiver, a transmitter, and a baseband processor of the wireless device responsive to said determining;
wherein determining whether or not the component carriers are collocated comprises:
computing at least one of: the time of arrival difference between the respective times of arrival of the component carriers, the power level difference between the respective received power levels of the component carriers, or the frequency offset difference between the respective frequency offsets of the component carriers; and
comparing at least one of: the time of arrival difference, the frequency offset difference, or the power level difference to a respective predetermined range.

21. The method of claim 20, wherein determining whether or not the component carriers are adjacent and collocated comprises:
computing at least one of: the time of arrival difference between the respective times of arrival of the component carriers, the power level difference between the respective received power levels of the component carriers, or the frequency offset difference between the respective frequency offsets of the component carriers; and
comparing at least one of: the time of arrival difference, the frequency offset difference, or the power level difference to a respective predetermined range,
wherein the component carriers are determined to be collocated if one or more of the time of arrival difference, the frequency offset difference, and the power level difference is within the respective predetermined range.

22. The method of claim 20, wherein the component carriers are determined to be collocated, and wherein configuring the receiver comprises:
configuring the receiver to process the component carriers simultaneously using a common receive chain of the receiver.

* * * * *